No. 615,768. Patented Dec. 13, 1898.
J. W. WAGNER.
BICYCLE FRAME.
(Application filed Feb. 10, 1897.)
(No Model.) 2 Sheets—Sheet 1.
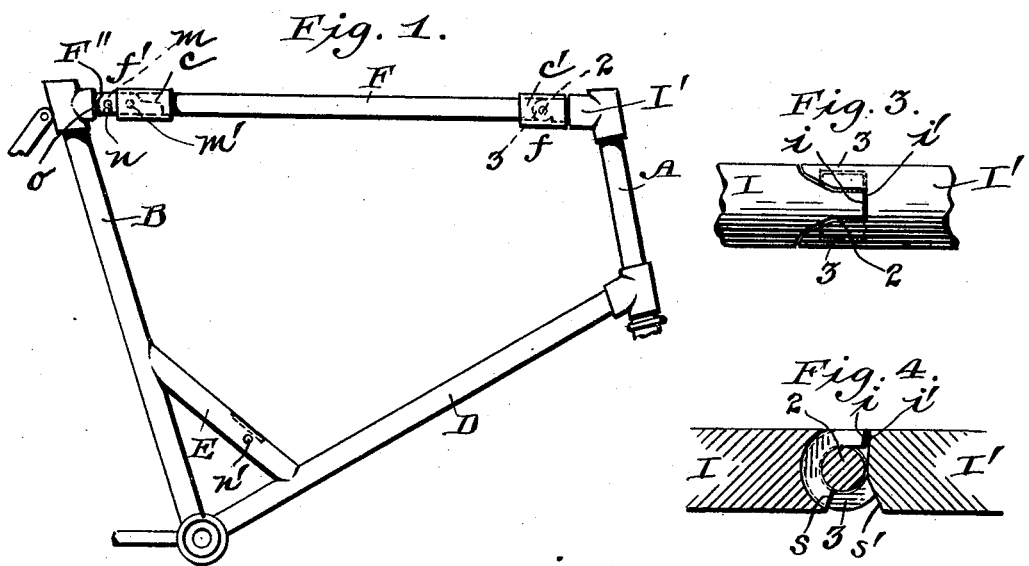
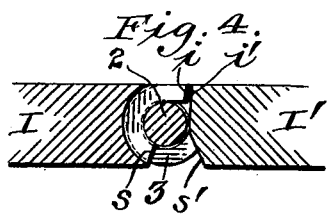
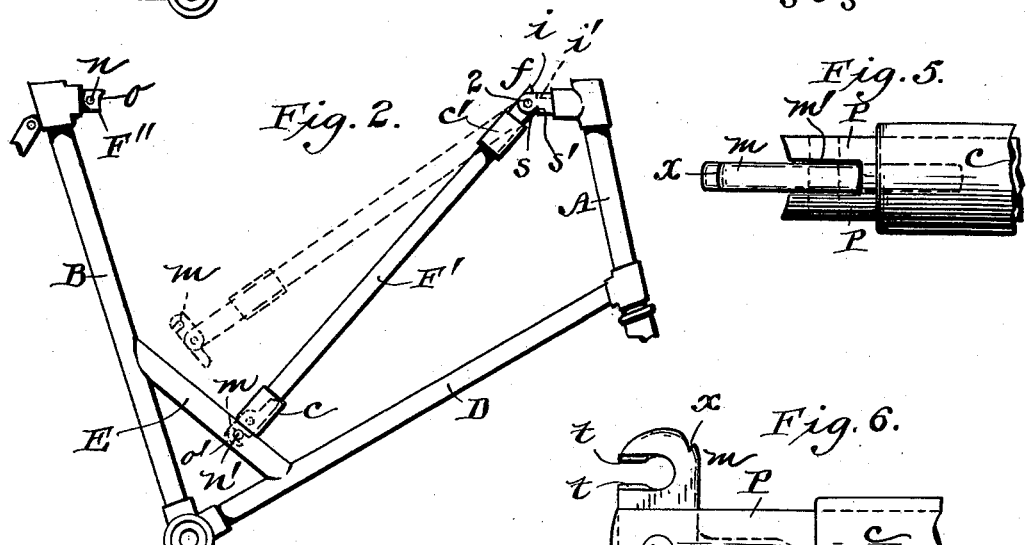
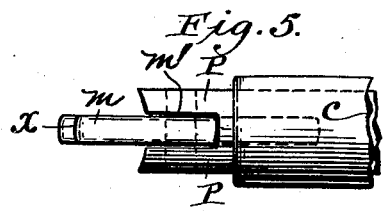
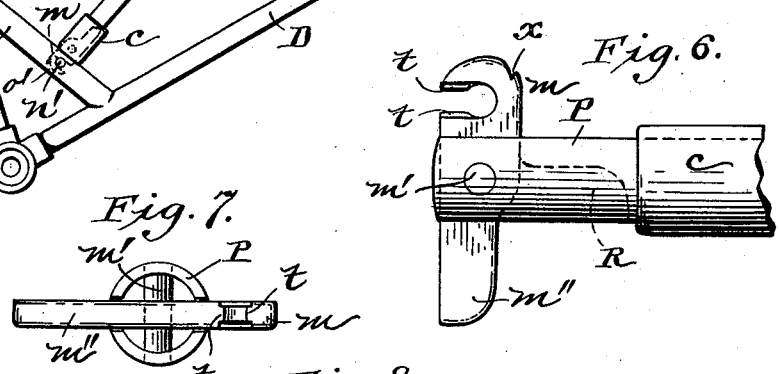
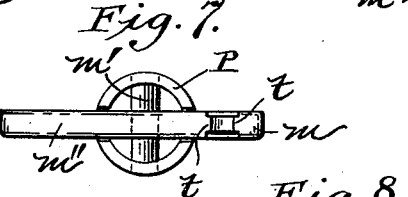
WITNESSES
INVENTOR No. 615,768. Patented Dec. 13, 1898.
J. W. WAGNER.
BICYCLE FRAME.
(Application filed Feb. 10, 1897.)
(No Model.) 2 Sheets—Sheet 2.

WITNESSES
INVENTOR
John W. Wagner

UNITED STATES PATENT OFFICE.

JOHN W. WAGNER, OF OSHKOSH, WISCONSIN.

BICYCLE-FRAME.

SPECIFICATION forming part of Letters Patent No. 615,768, dated December 13, 1898.

Application filed February 10, 1897. Serial No. 622,822. (No model.)

*To all whom it may concern:*

Be it known that I, JOHN W. WAGNER, a citizen of the United States, residing at Oshkosh, in the county of Winnebago and State of Wisconsin, have invented certain new and useful Improvements in Bicycle-Frames; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to convertible bicycle-frames; and the objects of my invention are, first, to provide a convertible frame that shall be capable of ready and easy adjustment from a gentleman's to a lady's form of wheel, and vice versa; second, to provide a means of obviating the tendency to rattle in both adjustments; third, to provide a lock or catch for a convertible wheel that shall be safe and secure and easy of adjustment, and, fourth, to provide a joint that shall be non-detachable and shall in either adjustment acquire and transmit the spring of the frame and insure rigidity thereof.

Figure 9:
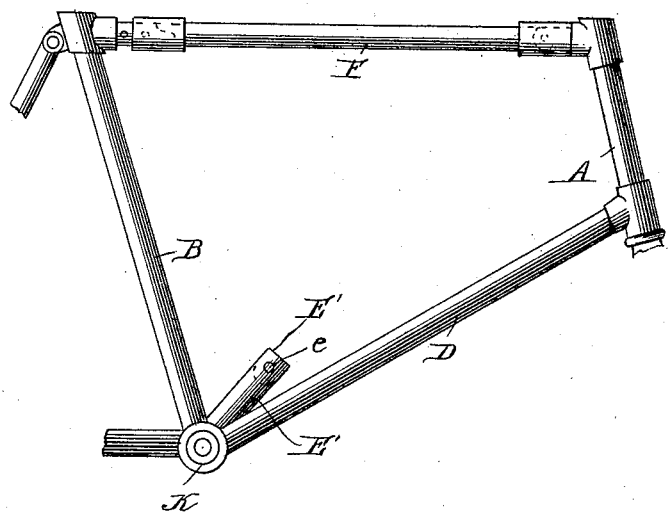
Figure 10:
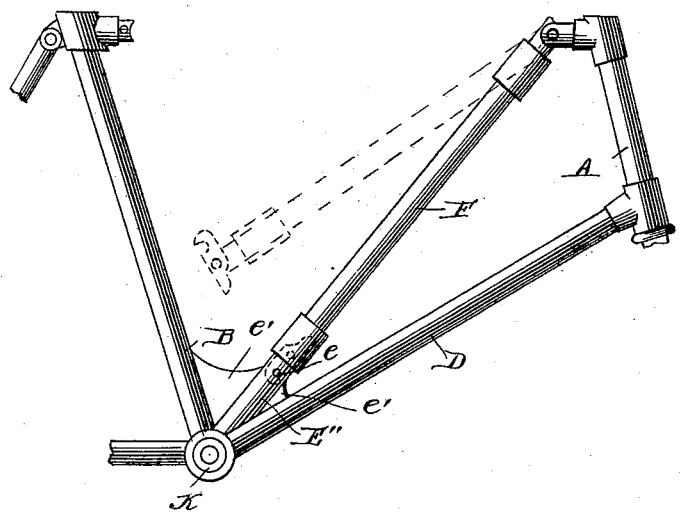

In the accompanying drawings, Figure 1 is a side elevation of the frame of a bicycle embodying my invention as adapted for gentlemen. Fig. 2 is a similar view, but showing the frame as converted into a lady's bicycle. Fig. 3 is a top view, and Fig. 4 a vertical section longitudinally of the knuckle-joint. Fig. 5 is a top view, and Fig. 6 a side view, of the latch. Fig. 7 is a bottom view of the latch, and Fig. 8 the pin which the latch engages. Fig. 9 is a side elevation of my improved bicycle, illustrating a projection for engaging the adjustable bar in its lowered position; and Fig. 10 represents a slight modification of the same.

A is the head-post, B the seat-post, and D the bottom brace, of the bicycle.

E is an auxiliary bar leading from the seat-post to the bottom brace of the bicycle and carrying a pin $n'$.

F is the cross-bar, which in my method of adapting the bicycle to ladies' use drops to the position F', Fig. 2, the front end being attached to the frame by means of a knuckle-joint $f$ and the rear end $f'$ capable of being latched to the frame at the top F'' to adapt it to a gentleman's wheel or to the bar E below to convert it into a lady's wheel.

The latch or lock consists of a hook $m$, pivoted to the ears P P of the bar F by the pivot $m'$. The opposite end $m''$ when latched folds within the recess R in the cross-bar and is covered by the sliding cover $c$, sliding upon the bar F to effectually secure the latch and prevent it from rotating upon the pivot. The latch is operated by first rotating the hook $m$ so as to enter the opening T and engage the pin $n'$ and then sliding the cover $c$ so as to inclose the latch and lock it. An opposite cover $c'$ is provided to inclose the knuckle-joint when the bar is adjusted to the gentleman's form of wheel.

The object of my invention in both adjustments is to provide a bearing at both ends of the bar F against the spring of the frame, and for this purpose in adjusting the frame for gentlemen the projection $i$ bears against the stop $i'$, and the latch $m$ when adjusted bears closely against the pin $n$ and the opposite circular head $o$. When adjusted to a lady's form of wheel, the projection $s$ bears against the stop $s'$, and the latch $m$ bears against the pin $n'$ and the opposite circular head $o'$. By reason of the projection $i$ engaging the stop $i'$ in the adjustment to a gentleman's form of wheel it is necessary to spring the bar F upward slightly in order to bring it on a direct line, so as to lock to the opposite end F''. In the adjustment to a lady's frame by reason of the projection $s$ striking against the stop $s'$ it is necessary to spring the bars slightly downward in order to engage and lock around the pin $n'$.

An important feature of my invention is the construction of the end of the hook $m$ upon a widening circle, so that in either adjustment it will hug closely against the circular heads $o$ and $o'$, respectively, in either adjustment.

The knuckle-joint $f$ is constructed so as to be non-detachable. The part I is provided with a circular lug 2, and the part I' is first constructed in two longitudinal sections provided with extending ears 3 3, each ear having a recess corresponding with each side of the lug 2. The two parts are then brazed together, the two ears 3 3 extending to surround the circular lug 2, thus providing a non-detachable connection and avoiding the use of any pivot.

The hook $m$ is provided with internal longitudinal ribs $t\ t$ on each side, which fit into the inclined depression $T''$ of the pin $n'$ to bind closely and prevent any tendency to side motion of the hook.

If the latch should not readily open, a catch $x$ is provided and an ordinary hook may be used to engage it and open the latch.

I do not regard the auxiliary bar E as an essential feature of my invention and do not wish to confine my invention to any extension or projection below provided for that purpose.

As shown in Fig. 9 of the drawings, a projection $E'$ may be used instead of the bar E. In this construction the upper free end of the projection $E'$ is provided with an opening similar to that at $F''$ and carries a pin, as $e$, which is adapted to be engaged by the hook in the end of the adjustable bar, as above described. Of course it will be apparent that the projection $E'$ may extend from the crank-hanger K or from either the brace D or the seat-post B, as may be desired, without departing in the least from the spirit of my invention.

As shown in Fig. 10 of the drawings, a projection $E''$ may be employed which is similar to the projection $E'$, but is strengthened by webs, as $e'\ e'$, which join it to the brace D and the seat-post B. This makes a very rigid and secure construction.

By means of the construction of the knuckle-joint and the method of latching, as described, the spring of the frame is preserved and all tendency to rattle is eliminated.

Having now described my invention, what I claim as new, and desire to secure by Letters Patent, is—

1. In a bicycle, the combination with front and rear posts and a lower brace, of an auxiliary brace, a top cross-bar connected at one end to the front post by means of a joint and a projection on the rear post provided with a transverse pin, a transverse pin also in the auxiliary brace, a hook pivotally secured at one end of the said top cross-bar adapted to engage a pin in the said projection of the rear post or the pin in the said brace, and means for locking the hook when engaging the said pins, substantially as described.

2. In a bicycle-frame, the combination of a front post and a rear post and a lower brace, an auxiliary brace, a top cross-bar pivotally secured to the said front post by means of a joint, a pivoted hook mounted in the other end of the said top cross-bar, the said hook being provided with means for engaging a pin at the top of the rear post or a pin in the said auxiliary brace, and a sliding sleeve upon said cross-bar for locking the said hook in its adjusted position, substantially as described.

3. In a convertible bicycle-frame, the combination with front and rear posts, of a top cross-bar hinged at one end to the front post and adapted to fill the space between the said hinged point and upper and lower engaging portions upon the said frame, pins mounted in the frame at the points of upper and lower engagement, and a pivoted hook mounted in the free end of the said cross-bar and adapted to engage the said pins for locking the said bar in its upper and lower engaging positions, substantially as described.

4. A convertible bicycle-frame consisting of front and rear posts, an extension or projection on the frame, a top cross-bar hinged at one end to the front post and adapted when in its lowered position to fill the space between the pivotal point of the said bar and the said extension or projection on the frame, a pivoted hook mounted on the other end of the said bar a means on the frame adapted to be engaged by the said hook, whereby said bar is adapted to be detachably secured to the said rear post or to the said extension or projection, substantially as described.

5. In a bicycle-frame, the combination with front and rear posts, of a hinged cross-bar pivoted to the front post and carrying at its free end a pivoted hook adapted to engage pins or other detents located in upper and lower engaging portions of the frame, the said bar being adapted to fill the space between the said upper and lower engaging portions and the pivoted point of the bar, the said pins being provided with reduced engaging portions, and reduced engaging lips formed upon the said hook and adapted to engage the reduced portions of the pins, whereby a snug joint is adapted to be secured between the parts, substantially as described.

6. In a bicycle-frame, the combination with front and rear posts, of a pivoted top cross-bar adapted to convert the frame from a man's to a woman's wheel, engaging pins mounted in the upper and lower parts of the said frame, a pivoted hook mounted in the free end of the top cross-bar and adapted to engage the said pins for locking the bar in its upper and lower positions, and a shoulder formed upon the said hook whereby it may be engaged by a suitable instrument for releasing the hook from the pins, substantially as described.

7. In a bicycle-frame, the combination with front and rear posts, of a cross-bar hinged at one end to the said front post and adapted to fill the space between its pivotal point and upper and lower engaging portions formed upon the frame, a pivoted hook for engaging pins mounted in the said upper and lower engaging portions, a sliding sleeve mounted on the cross-bar and adapted to inclose the pivoted joint when the bar is in its upper position for assisting in holding the parts in a firm position, and a sliding sleeve for holding the pivoted hook in its engaging position at the other end of the said bar, substantially as described.

In testimony whereof I affix my signature in presence of two witnesses.

JOHN W. WAGNER.

Witnesses:
F. J. McKENNEY,
HENRY HENKEL.